Figure 1:
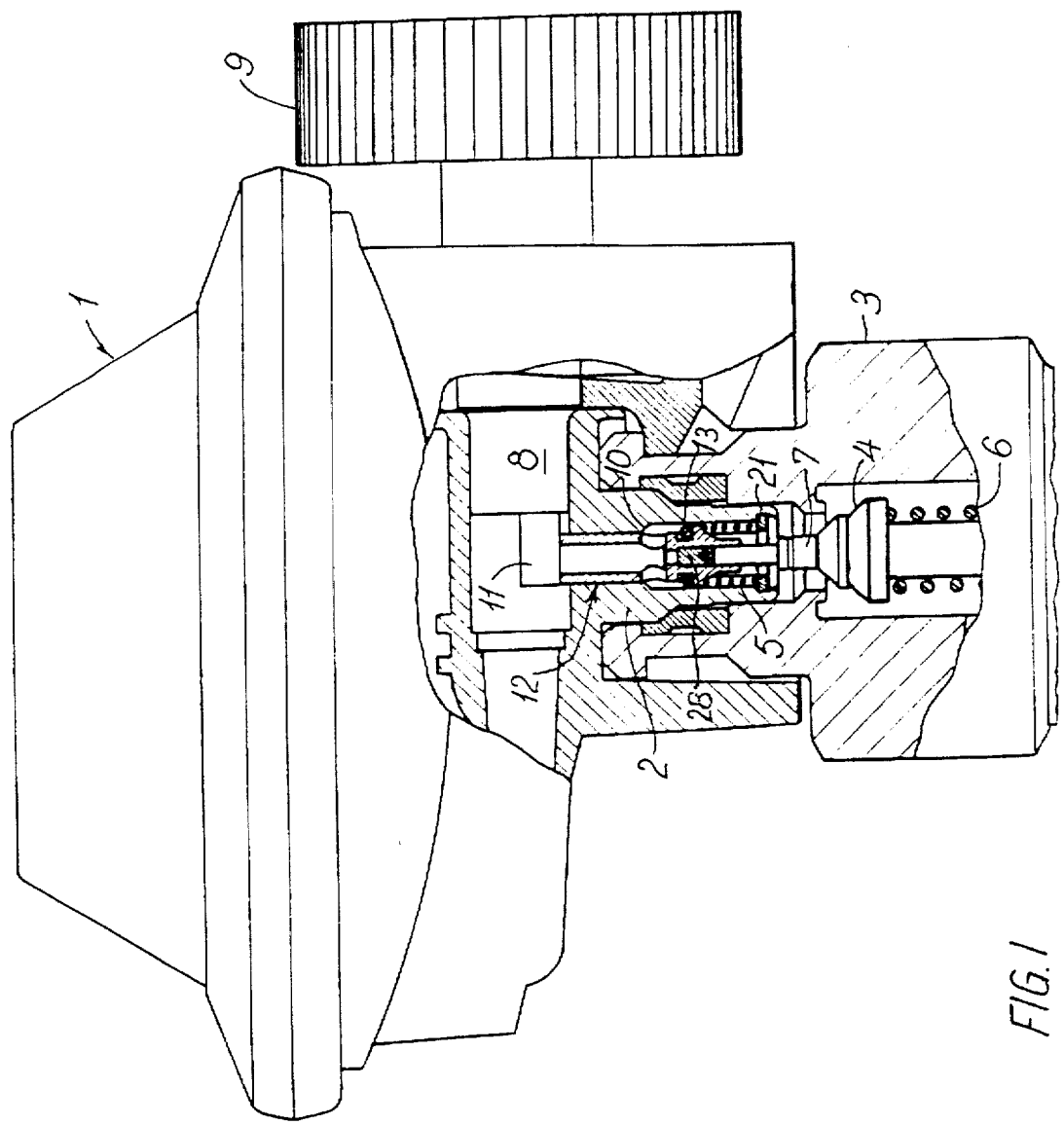

United States Patent [19]
Jensen

[11] Patent Number: 5,787,918
[45] Date of Patent: Aug. 4, 1998

[54] REDUCTION VALVE AND GAS CONTAINER VALVE FOR A BOTTLE FOR LIQUIFIED GAS

[75] Inventor: Klaus Ulrik Pihl Jensen, Helsingør, Denmark

[73] Assignee: Kosan Teknova A/S, Nivå, Denmark

[21] Appl. No.: 552,954

[22] Filed: Nov. 3, 1995

[30] Foreign Application Priority Data

Nov. 4, 1994 [DK] Denmark ................... 1277/94

[51] Int. Cl.[6] .................................. F16K 17/38
[52] U.S. Cl. ........................ 137/75; 137/614.06
[58] Field of Search ............. 137/74, 75, 614.06

[56] References Cited

U.S. PATENT DOCUMENTS

| | | | |
|---|---|---|---|
| 4,059,125 | 11/1977 | Sugimura | 137/73 |
| 4,290,440 | 9/1981 | Sturgis | 137/75 |
| 4,352,365 | 10/1982 | Boccardo et al. | 137/74 X |
| 4,974,623 | 12/1990 | Sturgis | 137/75 X |

FOREIGN PATENT DOCUMENTS

| | | |
|---|---|---|
| 141669 | 5/1980 | Denmark . |
| 2358428 | 6/1975 | Germany . |
| 546368 | 2/1974 | Switzerland . |
| 900071 | 7/1962 | United Kingdom . |
| 1428249 | 3/1976 | United Kingdom . |
| 2020383 | 11/1979 | United Kingdom . |

*Primary Examiner*—John Rivell
*Attorney, Agent, or Firm*—Lane, Aitken & McCann

[57] ABSTRACT

The reduction valve (1) comprises an activating spindle (12;42) which by a control handle on a pivotable shaft (8) and an eccentric spigot (11) is displaceable for opening of a self-closing valve (4) in a gas container valve (3) for a bottle for liquified gas. A section (18;49) of the activating spindle or of the self-closing valve (4) is made from a material having a low yield temperature, such that heating thereof, for instance caused by fire, causes the material to yield, whereby the activating spindle (12;42) or the self-closing valve (4), respectively, is shortened under influence of the biasing force from the spring (6) of the valve (4), whereby the valve (4) closes.

22 Claims, 7 Drawing Sheets

FIG. 7

FIG. 6

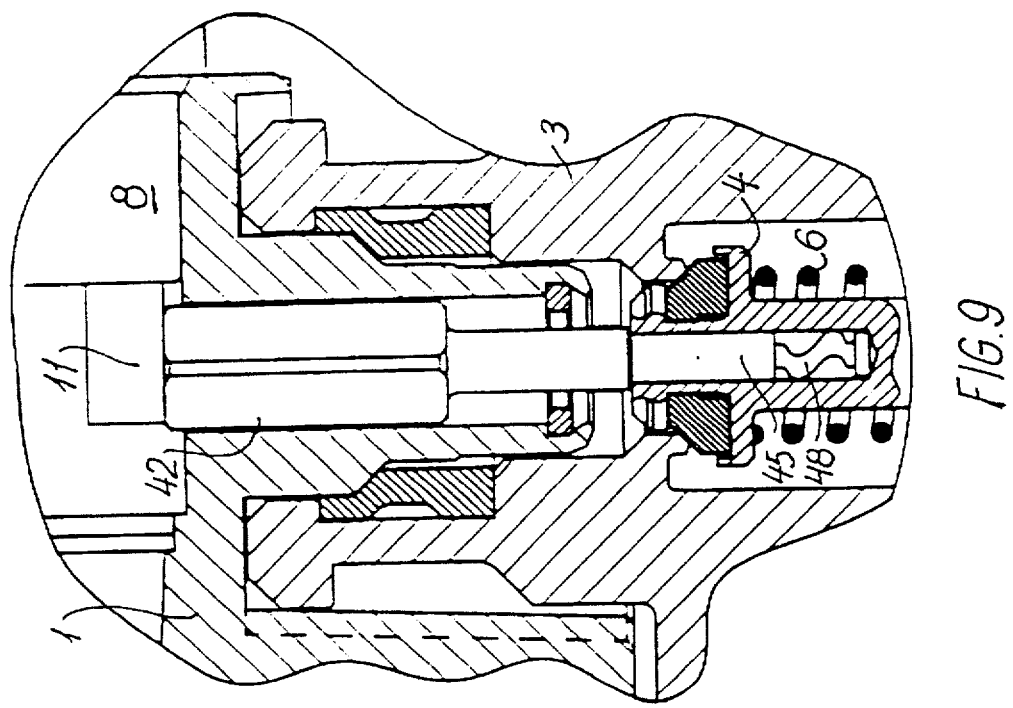
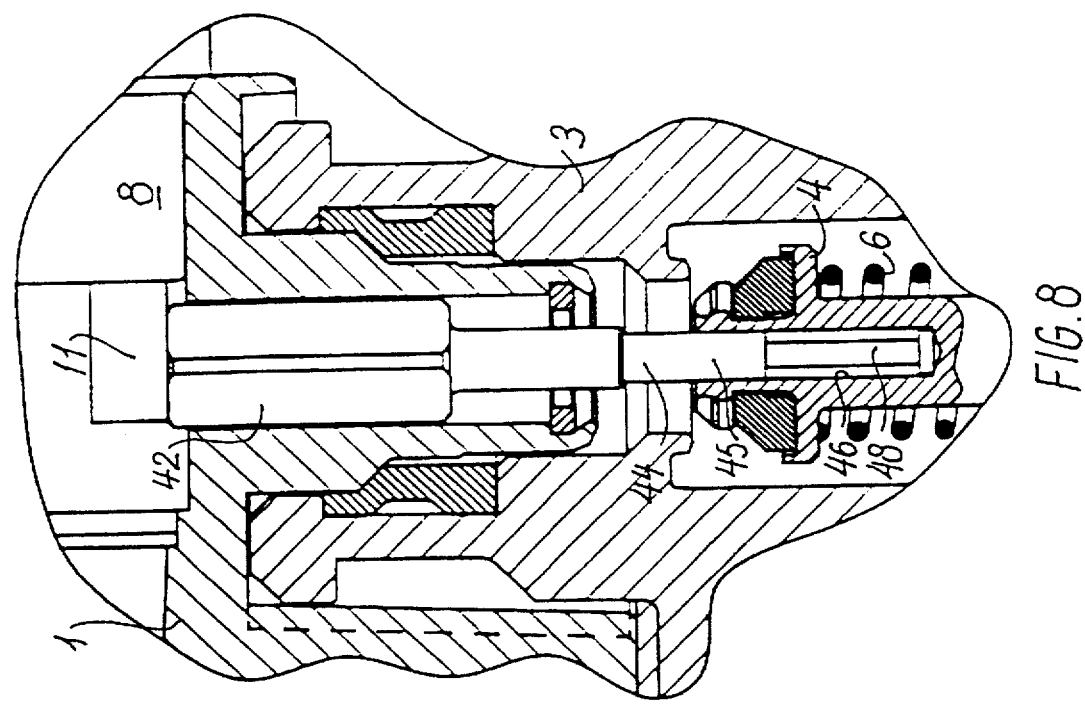

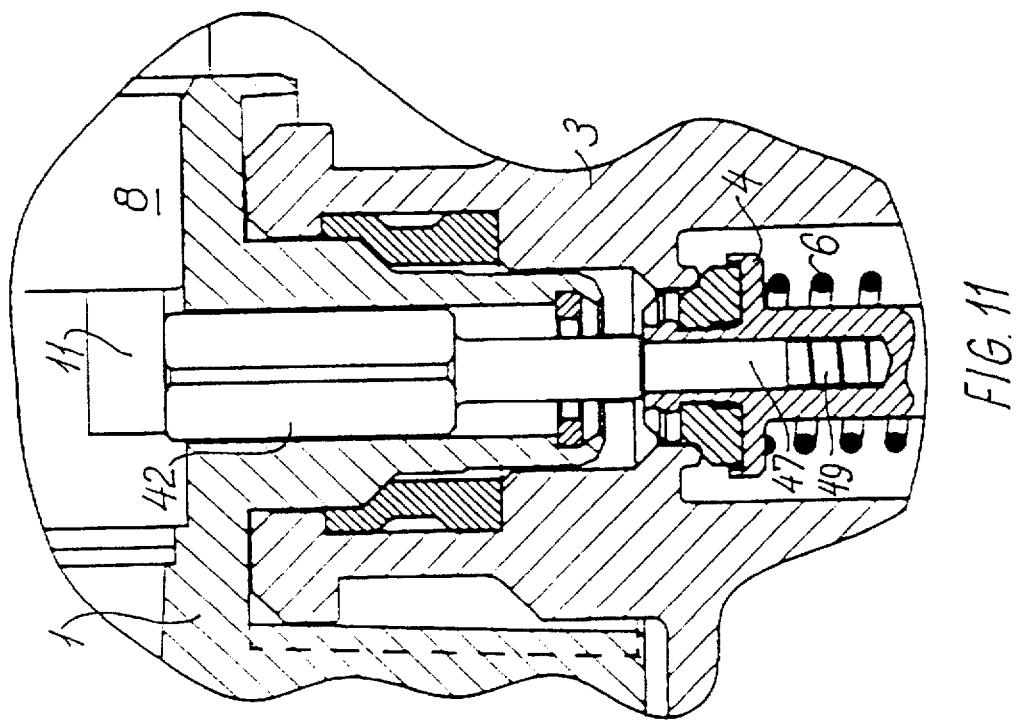
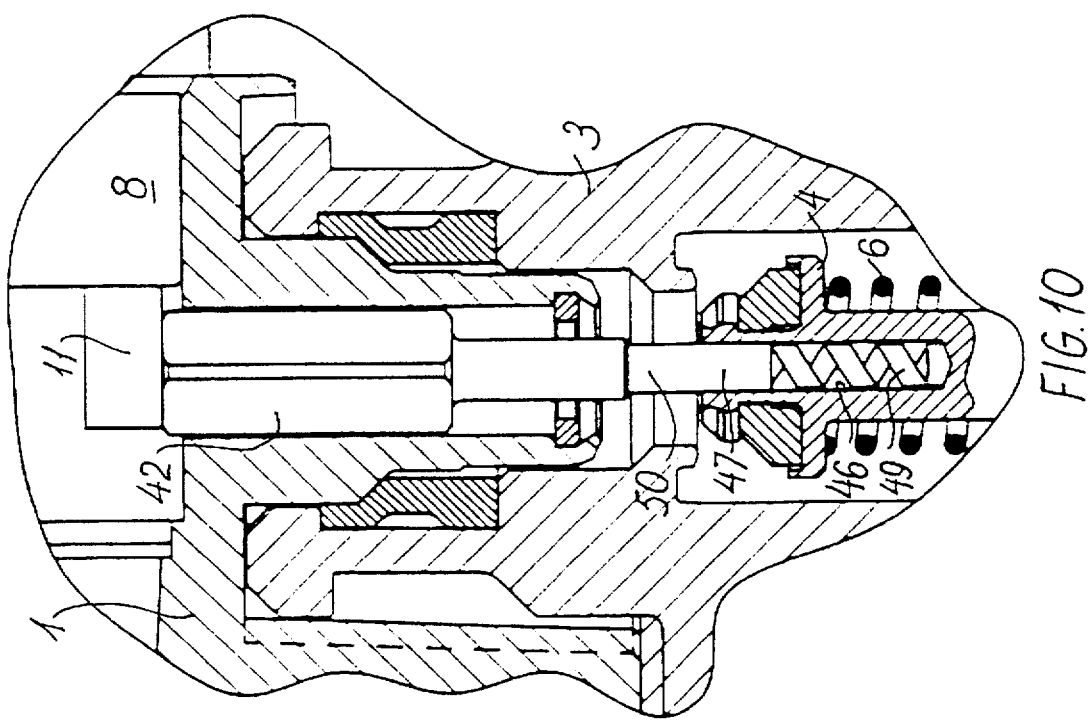

REDUCTION VALVE AND GAS CONTAINER VALVE FOR A BOTTLE FOR LIQUIFIED GAS

The invention relates to a reduction valve for mounting on a gas container valve for a bottle for liquified gas comprising an activating spindle which is displaceable for opening of a self-closing valve in the gas container valve by overcoming the bias from the valve spring of the self-closing valve. The invention also relates to a gas container valve for a bottle for liquified gas for connection with a reduction valve, and comprising a self-closing valve which by a valve spring is biased for closing, the self-closing valve being adapted to open by displacement of an activating spindle in the reduction valve by overcoming the bias from the valve spring.

A reduction valve and a gas container valve of the above type is disclosed in DK-B-141 669. The activating spindle of the prior art reduction valve is pressed by an eccentric portion on a shaft, which may be turned by means of a control handle, against the spindle on the self-closing valve and keeps it open as long as the control handle is turned to its open position. In case of overheating of the reduction valve, for instance due to fire in the room, in which it has been installed, closure of the self-closing valve by turning the control handle of the reduction valve will normally be impossible, as the control handle is too hot to be touched, or access to the handle is impeded by the fire. It is therefore desirable to design the reduction valve or the gas container valve in such a way that the self-closing valve is automatically closed at overheating.

It is thus the object of the invention to provide a reduction valve and a gas container valve which are arranged such that the self-closing valve in the gas container valve closes, when the temperature in the reduction valve or in the gas container valve exceeds a predetermined value. This is according to the invention obtained thereby that at least one section of the activating spindle is made of a material having a low yield temperature and is biased by the valve spring, when the activating spindle is displaced for opening of the self-closing valve such that heating of the material to yield temperature causes the material to yield under the load from the valve spring, whereby said section of the activating spindle is shortened and the self-closing valve closes.

A preferred embodiment of the reduction valve is characteristic in that the section of the activating spindle made from material with a low yield temperature is an essentially cylindrical rod, one end of which is adapted to engagement with the self-closing valve. The material having a low yield temperature may be a plastic material, preferably PVC, the yield or formstability temperature of which for instance is determined by a standardized method: VSP (Vicat 5 kg), described in DIN 53460. When the activating spindle is heated, the cylindrical rod becomes deformed or upset due to the bias from the valve spring, such that the self-closing valve closes.

A second embodiment of the reduction valve according to the invention is characteristic in that the activating spindle comprises a guide member and a spindle member for engaging the self-closing valve, and that the section of the activating spindle, which is made from a material having a low yield temperature, is a plug of a eutectic material and positioned between a narrowing in an axial bore in the guide member and a spigot on the spindle member soldered into the bore. In this embodiment the activating spindle is telescopically shortened by heating to the yield temperature of the eutectic material, which under the influence of the biasing force of the valve spring will be driven out through the axial bore in the guide member of the activating spindle.

As the soldered joint between the spigot and the axial bore does not in itself have sufficient shear strength to resist the spring load from the self-closing valve during an extended period of use, it is necessary that the space at the end of the spindle is filled with a material which may partly transfer the compressive strain from the end of the spigot to the narrowing in the bore, and consequently to the guide member when operating at normal temperature, partly flow away at a predetermined higher temperature, thereby allowing the telescopic compression of the two components of the activating spindle.

According to a third embodiment the activating spindle may comprise a guide member and a spindle member for engaging the self-closing valve, and the section of the activating spindle which is made from a material having a low yield temperature may be a plug of a eutectic material, said plug being positioned between the bottom of an axial, blind bore in the spindle member and a spigot on the guide member soldered into the bore. In this embodiment the eutectic material will when heated flow away along the outer surface of the spigot. To prevent the solder from spreading uncontrollably thereby, the spigot on the guide member of the activating spindle may according to a fourth embodiment have a central relief bore which through a transverse bore near the end of the spigot is connected with the outer surface of the spigot, which results in the eutectic material being collected in the relief bore.

In an embodiment of a reduction valve with a connection piece adapted to introduction into the discharge portion of the gas container valve, the activating spindle may have a valve section which by a spring is biased against an associated seat in the connecting piece. Hereby is obtained in a manner known per se that leak gas from a leaking valve in the gas container valve is prevented from penetrating into the reduction valve, when its control handle is in the closed position. The embodiment has, however, the further advantage that the valve section of the activating spindle by its spring is brought to close at overheating of the reduction valve, even though its control handle is in the open position. This simultaneous closure of the self-closing valve in the gas container valve and the valve section in the connection piece of the reduction valve results in an exceedingly high degree of safety against gas leakage at overheating of the reduction valve.

The eutectic material may be an alloy of metals chosen among Bi, Cd, Pb, Sn and Zn, the specific composition being determined by the requirements to yield or melting temperature, contraction or expansion during solidification as well as solderability. As examples of suitable alloys may be mentioned 57Bi43Sn with a melting point of 138° C., 55Bi44Pb1Sn with a melting point of 117°–120° C. and 54Bi26Sn20Cd with a melting point of 103° C.

The invention also relates to a gas container valve for a bottle for liquified gas for connection with a reduction valve, and comprising a self-closing valve which by a valve spring is biased for closing, the self-closing valve being adapted to open by displacement of an activating spindle in the reduction valve by overcoming the bias from the valve spring, which gas container valve is characteristic in that at least one section of the self-closing valve is made from a material having a low yield temperature and is biased by the valve spring when the activating spindle is displaced for opening of the self-closing valve, such that heating of the material to yield temperature causes the material to yield to the load from the valve spring, whereby said section of the self-closing valve is shortened and the valve closes.

Further embodiments of the gas container valve according to the invention appear from claims 10–14.

Figure 3:
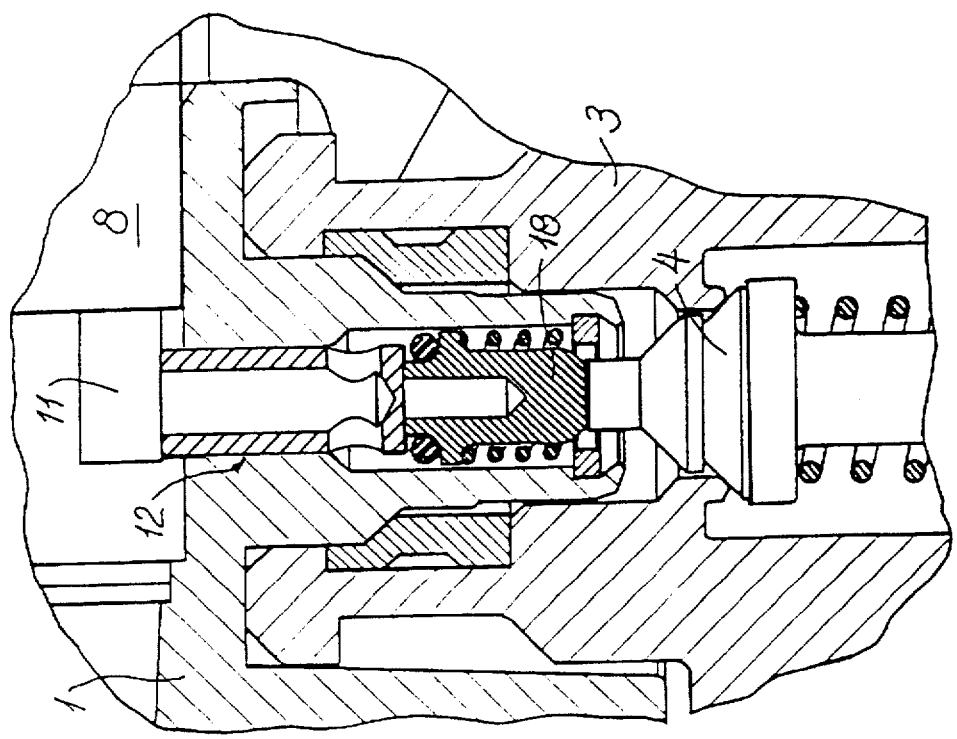
Figure 2:
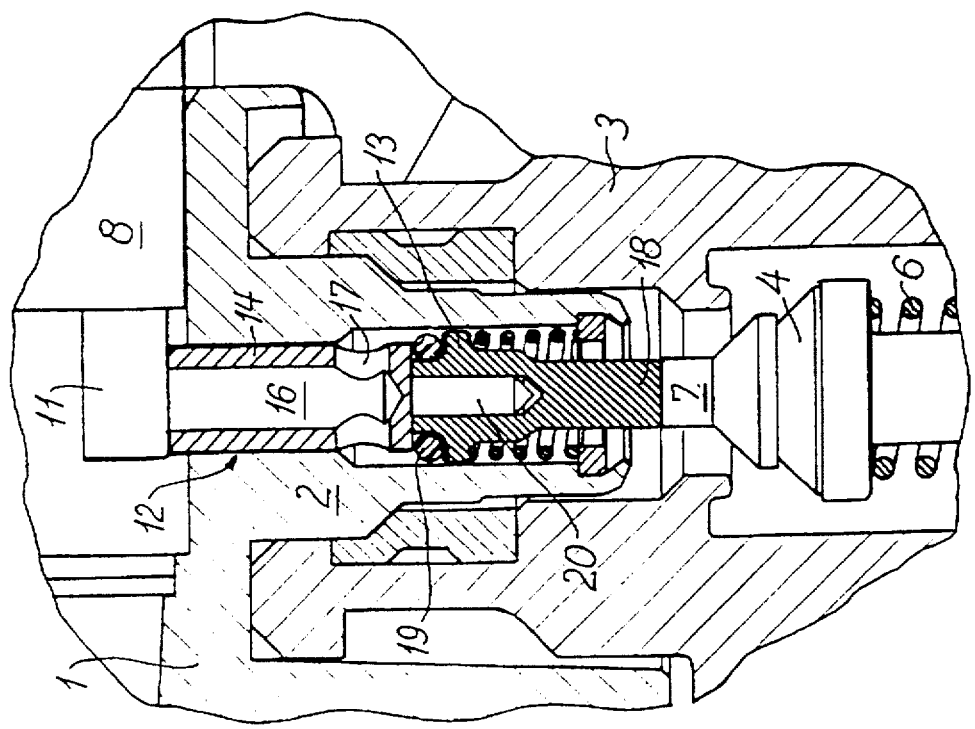
Figure 4:
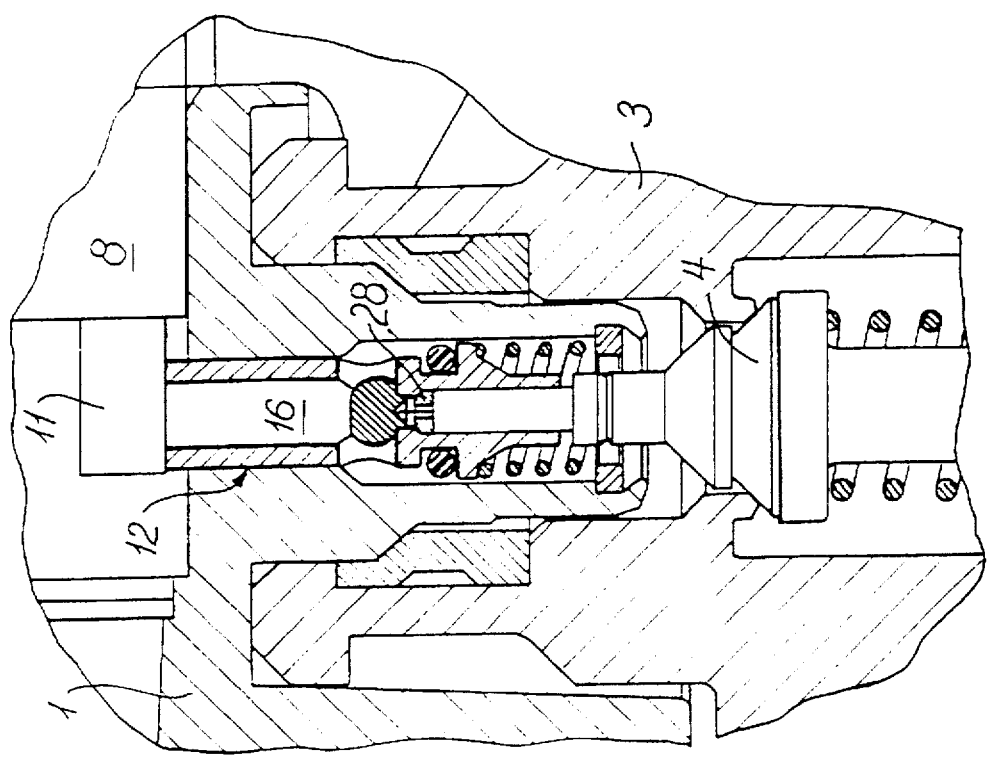
Figure 5:
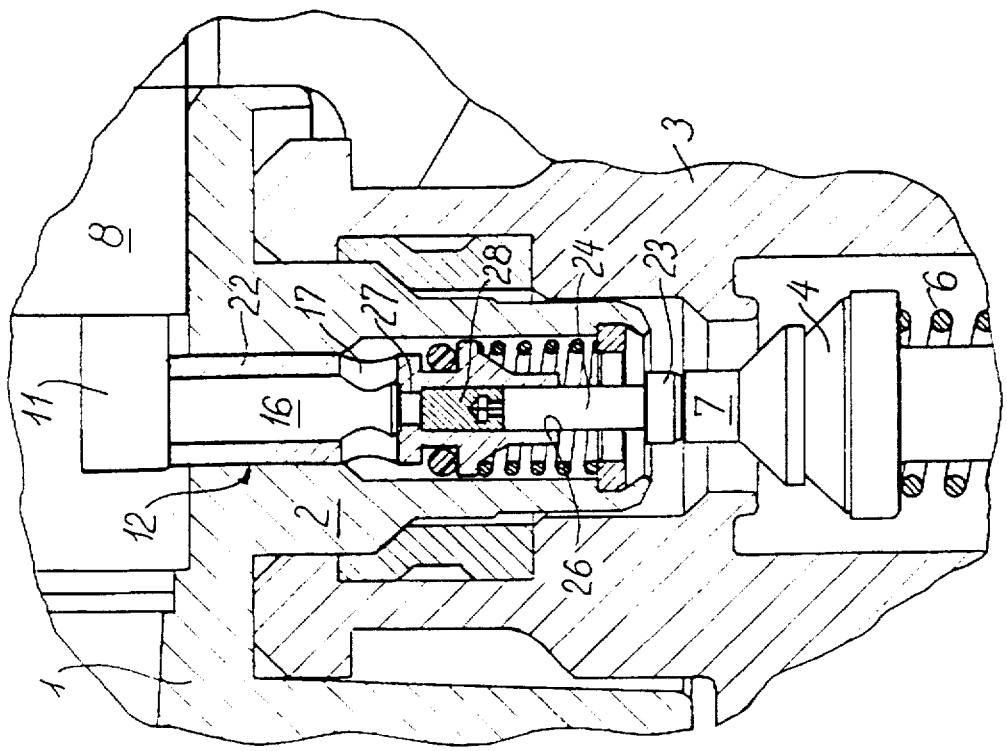
Figure 13:
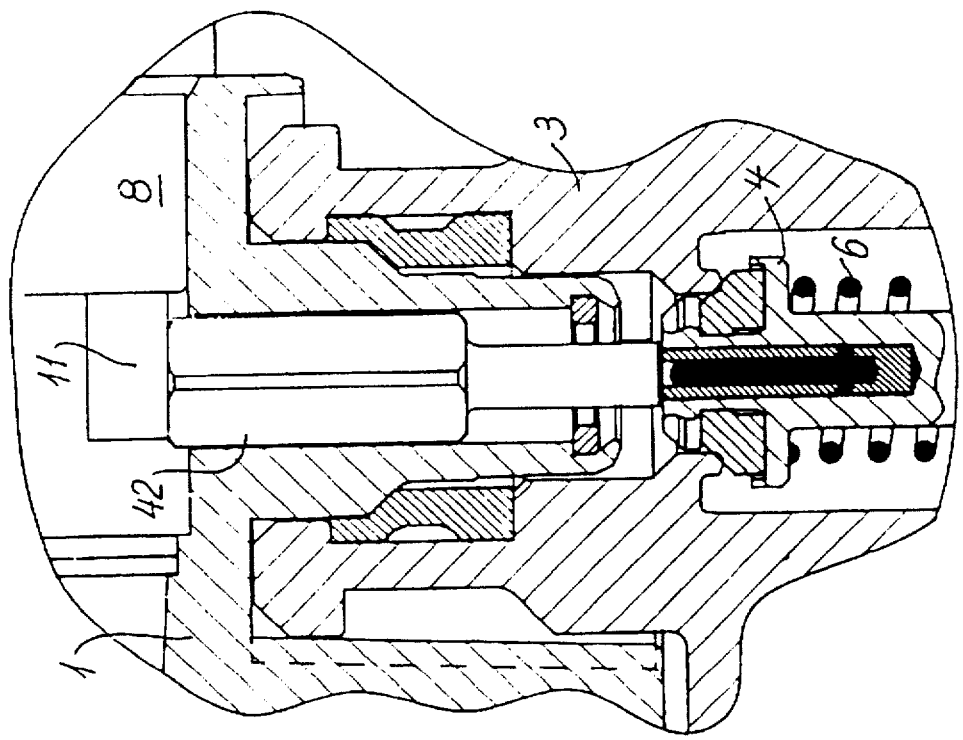
Figure 12:
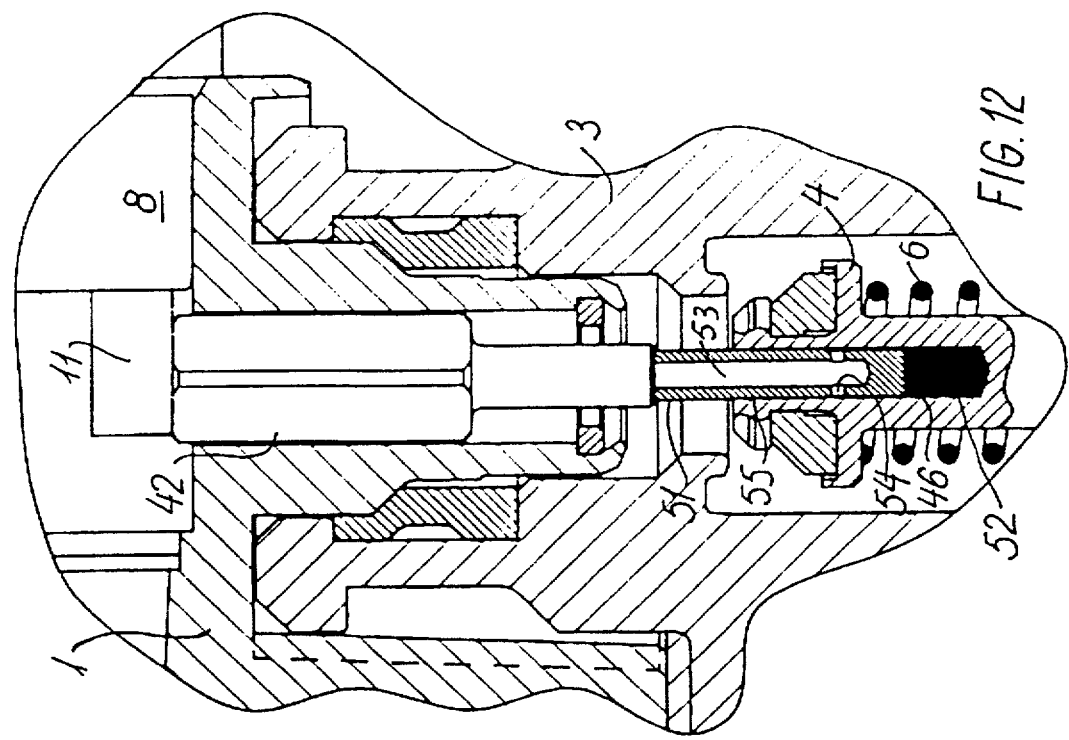

The invention will now be explained in detail by means of some embodiments and with reference to the drawing, on which FIG. 1 is a sectional view of a reduction valve according to the invention connected with a gas container valve according to the invention, FIGS. 2 and 3 are sectional views at a larger scale of the connecting piece in the reduction valve with an activating spindle, the spindle member of which is made from a plastic material with low yield temperature, shown before and after overheating of the reduction valve, respectively, FIGS. 4 and 5 are sectional views like in FIG. 2 and 3, but the guide member and the spindle member of the activating spindle are soldered together by means of a material with low yield temperature, FIGS. 6 and 7 are sectional views like in FIGS. 4 and 5, but the valve section of the activating spindle is mounted on the spindle member, FIGS. 8 and 9 are sectional views like in FIGS. 4 and 5, but the material with low yield temperature is placed in the self-closing valve and is a plastic rod comprising a section with reduced diameter, FIGS. 10 and 11 are sectional views like in FIGS. 8 and 9, but the plastic element is a plastic rod with a helically shaped portion, and FIGS. 12 and 13 are sectional views like in FIGS. 8 and 9, but showing another embodiment.

The reduction valve 1 shown in FIG. 1 has a connecting piece 2 which is connected with a discharge portion 3a on a gas container valve 3. The discharge portion 3a contains a self-closing valve 4 which by a valve spring is pressed against a seat. The valve 4 has a short spindle 7 extending towards the mouth of the discharge portion. The reduction valve has a rotatable shaft 8, which at one end has a control handle 9 and at the other end an eccentric portion 11, which by turning of the control handle 9 from a closing position to an opening position presses an activating spindle 12 towards the spindle 7, thereby opening the valve 4. The activating spindle 12 has a valve section 13, which when the activating spindle is not activated, presses against a seat 10 in the connecting piece 2 of the reduction valve by a spring 5 positioned in the connecting piece, said spring being retained by a locking ring 21.

The activating spindle 12 shown in FIG. 2 consists of a cylindrical guide member 14, which slides in a bore in the connecting piece 2 and which has an axial bore 16 which in a manner known per se is provided with a pair of lateral openings at the bottom end to facilitate the outflow of the gas, and a spindle member 18 carrying the valve section 13 of the activating spindle, said valve section comprising an O-ring 19 positioned in a groove in the valve section 13. The guide member 14 is made from brass and carries a spigot 20 which is inserted in a corresponding bore in the spindle member 18, which is made from a PVC plastic material, the yield temperature of which is approx. 100° C. As will be seen in FIG. 3, the spindle member 18, which is loaded by the force from the spring 6, will when heated to said temperature, be deformed to such a degree that the self-closing valve 4 closes.

The activating spindle 12 in FIG. 4 consists of a guide member 22 of brass and a spindle member 23, likewise of brass. The spindle member has a spigot 24 inserted in an axial bore 26 in the guide member and is soldered by means of a eutectic material melting at approx. 100° C. Between the spigot 24 and a narrowing 27 in the bore 16 of the guide member a plug made from the eutectic material is provided. By heating of the activating spindle to above 100° C., the plug 28 melts, and on account of the force from the spring 6, the eutectic material is by the spigot 24 pressed through the narrowing 27 as illustrated in FIG. 5, whereby the valve 4 closes, the extension of the plug 28 in the direction of the bore 16 being larger than the path travelled by the valve during the closing.

The activating spindle 12 shown in FIG. 6 consists of a guide member 30 with a spigot 31, which is inserted in an axial bore 32 in a spindle member 33. The members 32 and 33 are made from brass and are soldered together by means of a eutectic material of the type described above. Between the end of the spigot 31 and the bottom of the bore 32 a plug 34 of the eutectic material is provided. When the activating spindle is heated to above 100° C., it melts and penetrates as shown in FIG. 7 up through the gap between the spigot 31 and the wall of the bore 32 until it reaches a transverse bore 36 in the spigot and penetrates into the axial bore 16. In this way the eutectic material is prevented from finding its way to and possibly blocking the valve section 13 or the valve 4.

The valve section 13 of the activating spindle 12 is in this embodiment mounted on the spindle member 33, and it will be seen that the valve section with the O-ring 19 will come into abutment with the corresponding valve seat 10 in the connecting piece 2 under influence from the force of the spring 5, irrespective of whether the control handle is still in its opening position or not. This closing of the gas passage in the connecting piece further adds to the safety against gas leakage from a connected gas container with liquified gas in case of fire.

FIG. 8 shows a self-closing valve 4 with an axial bore 46 in which a plastic rod 45 is inserted, one end of which 44 abuts one end of the activating spindle 42 in the reduction valve, and the second end portion of which 48 has a reduced diameter. When the plastic rod 45 is heated, it will yield to the compressive force from the spring 6 and be upset or deformed as shown in FIG. 9, whereby the valve 4 closes.

The embodiment shown in FIGS. 10 and 11 correspond to the ones shown in FIGS. 8 and 9, but the plastic rod 47 in FIGS. 10 and 11 are provided with a helical portion 49, which when heated to above yield temperature will be compressed as shown in FIG. 11, which results in the spring 6 closing the valve 4.

The self-closing valve 4 shown in FIGS. 12 and 13 has an axial bore 46, in which a cylindrical rod 55 is soldered. One end 51 of the rod abuts the activating spindle 42 and between its other end and the bottom of the bore 46 a plug 52 of eutectic material with a yield temperature of approx. 100° C. is provided. The rod 55 has an auxiliary bore 53 and a transverse bore 54. When the self-closing valve 4 is heated to above 100° C., the eutectic material melts and penetrates as shown in FIG. 13 up through the gap between the rod 55 and the wall 46 of the bore until it reaches the transverse bore 54 and penetrates into the auxiliary bore 53, whereby the eutectic material is prevented from finding its way to and possibly blocking the valve 4.

The eutectic material may be of the type described above in connection with the mention of the reduction valve 1.

I claim:

1. A reduction valve (1) for mounting on a gas container valve (3) for a bottle for liquified gas comprising an activating spindle (12) which is displaceable for opening of a self-closing valve (4) in the gas container valve by overcoming the bias from a valve spring (6) of the self-closing valve, characterized in that at least one section (28) of the activating spindle (12) is made of a material having a low yield temperature and is biased by the valve spring (6), when the activating spindle is displaced for opening of the self-closing valve (4) such that heating of the material to yield temperature causes the material to yield under the load from the valve spring, whereby said section of the activating spindle is shortened and the self-closing valve closes, the reduction valve further characterized by means for locking the reduction valve in place relative to the self-closing valve when the self-closing valve is open and for permitting separation of the reduction valve from the self-closing valve when the self-closing valve is closed.

2. A reduction valve according to claim 1, characterized in that the section of the activating spindle (12) made from material with a low yield temperature is an essentially cylindrical rod (18), one end of which is adapted to engagement with the self-closing valve (4).

3. A reduction valve according to claim 1, characterized in that the material having a low yield temperature is a plastic material, preferably PVC.

4. A reduction valve according to claim 1, characterized in that the activating spindle (12) comprises a guide member (22) and a spindle member (23) for engaging the self-closing valve (4), and that the section of the activating spindle, which is made from a material having a low yield temperature, is a plug (28) of a eutectic material and positioned between a narrowing (27) in an axial bore (16) in the guide member and a spigot (24) on the spindle member soldered into the bore.

5. A reduction valve according to claim 1, characterized in that the activating spindle (12) comprises a guide member (30) and a spindle member (33) for engaging the self-closing valve (4), and that the section of the activating spindle which is made from a material having a low yield temperature is a plug (34) of a eutectic material, said plug being positioned between the bottom of an axial, blind bore (32) in the spindle member (33) and a spigot (31) on the guide member soldered into the bore.

6. A reduction valve according to claim 5, characterized in that the spigot (31) on the guide member (30) of the activating spindle has an axial relief bore (35) which through a transverse bore (36) near the end of the spigot is connected with the outer surface of the spigot.

7. A reduction valve according to claim 5 having a connection piece (2) adapted for introduction into into the discharge portion (3a) of the gas container valve (3), characterized in that the activating spindle (12) has a valve section (13) which by a spring (5) is biased against an associated seat (10) in the connecting piece.

8. A reduction valve according to claim 4, characterized in that the eutectic material has a yield temperature of 75°–150° C., preferably 100°–120° C.

9. A reduction valve according to claim 2, characterized in that the material having a low yield temperature is a plastic material, preferably PVC.

10. A reduction valve according to claim 6 having a connection piece (2) adapted for introduction into the discharge portion (3a) of the gas container valve (3), characterized in that the activating spindle (12) has a valve section (13) which by a spring (5) is biased against an associated seat (10) in the connecting piece.

11. A gas container valve according to claim 10, characterized in that the eutectic material has a yield temperature of 75°–150° C., preferably 100°–120° C.

12. A reduction valve according to claim 5, characterized in that the eutectic material has a yield temperature of 75°–150° C., preferably 100°–120° C.

13. A reduction valve according to claim 6, characterized in that the eutectic material has a yield temperature of 75°–150° C., preferably 100°–120° C.

14. A reduction valve according to claim 7, characterized in that the eutectic material has a yield temperature of 75°–150° C., preferably 100°–120° C.

15. A gas container valve (3) for a bottle for liquified gas for connection with a reduction valve (1) having means for locking the reduction valve in place relative to the gas container valve when the gas container valve is open and for permitting separation of the reduction valve from the gas container valve when the gas container is closed, and comprising a self-closing valve (4) which by a valve spring (6) is biased for closing, the self-closing valve being adapted to open by displacement of an activating spindle (42) in the reduction valve by overcoming the bias from the valve spring, characterized in that at least one section (45;47) of the self-closing valve (4) is made from a material having a low yield temperature and is biased by the valve spring (6) when the activating spindle (42) is displaced for opening of the self-closing valve, such that heating of the material to yield temperature causes the material to yield to the load from the valve spring, whereby said section of the self-closing valve is shortened and the valve (4) closes.

16. A gas container valve according to claim 15, characterized in that the section of the self-closing valve (4) made from a material having a low yield temperature is an essentially cylindrical rod (45;47), one end portion (44;50) of which is adapted to engagement with the activating spindle (42) and the second end portion of which is inserted in an axial bore in the self-closing valve, and that a part (48;49) of the second end portion has a reduced cross-section.

17. A gas container valve according to claim 16, characterized in that the material having a low yield temperature is a plastic material, preferably PVC.

18. A gas container valve (3) for a bottle for liquified gas for connection with a reduction valve (1), and comprising a self-closing valve (4) which by a valve spring (6) is biased for closing, the self-closing valve being adapted to open by displacement of an activating spindle (42) in the reduction valve by overcoming the bias from the valve spring, characterized in that at least one section (45;47) of the self-closing valve (4) is made from a material having a low yield temperature and is biased by the valve spring (6) when the activating spindle (42) is displaced for opening of the self-closing valve, such that heating of the material to yield temperature causes the material to yield to the load from the valve spring, whereby said section of the self-closing valve is shortened and the valve (4) closes, further characterized in that the self-closing valve (4) comprises a cylindrical rod (55), one end (51) of which is adapted to engage the activating spindle (42) and the second end of which is soldered in an axial blind bore (46) in the self-closing valve, and that the section of the self-closing valve made from a material having a low yield temperature is a plug (52) of a eutectic material located between the bottom of the axial bore (46) and the second end of the cylindrical rod (55).

19. A gas container valve according to claim 18, characterized in that the cylindrical rod (55) has an axial blind bore (53) extending from one end (51) of the rod, and a transverse bore (54) at the bottom of said axial bore (53).

20. A gas container valve according to claim 18, characterized in that the eutectic material has a yield temperature of 75°–150° C.

21. A gas container valve according to claim 18, characterized in that the eutectic material has a yield temperature of 75°–150° C.

22. In combination, a reduction valve and a gas container valve for a bottle for liquified gas, the reduction valve being mounted on the gas container valve, the gas container valve comprising a self-closing valve which is biased for closing by a valve spring, and the reduction valve comprising an activating spindle which is displaceable for opening of the self-closing valve in the gas container valve by overcoming the bias from the valve spring of the self-closing valve, and means for locking the reduction valve in place relative to the self-closing valve when the self-closing valve is open and for permitting separation of the reduction valve from the self-closing valve when the self-closing valve is closed, characterized in that at least one section of one of the self-closing valve and the activating spindle is made from a material having a low yield temperature and is biased by the valve spring when the activating spindle is displaced for opening of the self-closing valve, such that heating of the material to yield temperature causes the material to yield to the load from the valve spring, whereby said section is shortened and the valve closes.

* * * * *